No. 874,632. PATENTED DEC. 24, 1907.
M. STERNBERG.
SPRING CLASP.
APPLICATION FILED SEPT. 2, 1905.
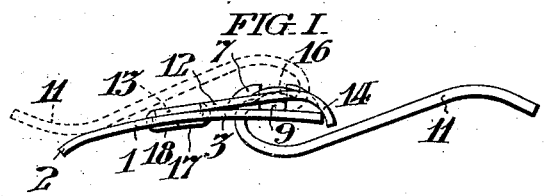
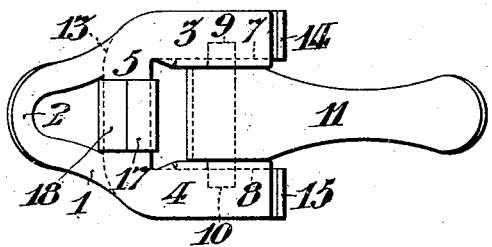
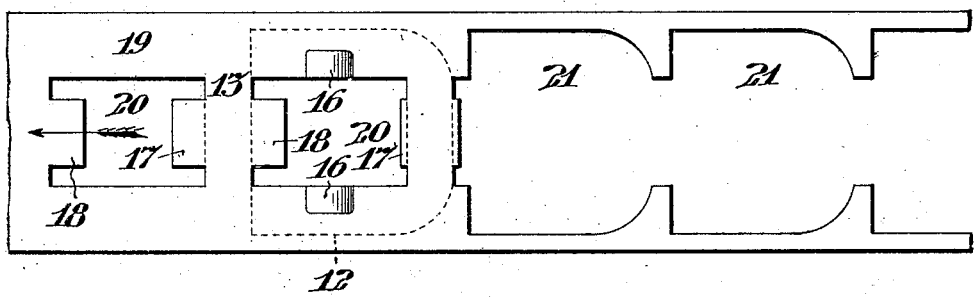
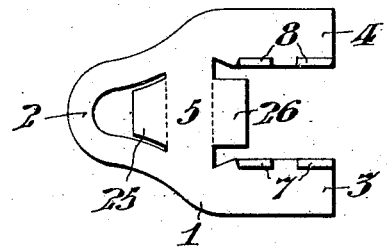
WITNESSES:
INVENTOR:
MARC STERNBERG,

UNITED STATES PATENT OFFICE.

MARC STERNBERG, OF PHILADELPHIA, PENNSYLVANIA.

SPRING-CLASP.

No. 874,632.  Specification of Letters Patent.  Patented Dec. 24, 1907.

Application filed September 2, 1905. Serial No. 276,837.

*To all whom it may concern:*

Be it known that I, MARC STERNBERG, of Philadelphia, in the county of Philadelphia and State of Pennsylvania, have invented certain new and useful Improvements in Spring-Clasps, whereof the following is a specification, reference being had to the accompanying drawings.

This invention relates to clasps of the class comprising a hook which is hinged to an attaching plate and held in its closed position by a spring, and particularly to the kind of clasp wherein the spring member is primarily separate from the attaching plate. As heretofore constructed, clasps of this kind comprise a member primarily made separate from the attaching plate and from the spring and requiring independent manipulation to secure said two members together.

It is an object of my invention to produce a clasp comprising an attaching plate and a spring plate opposed to each other and having lugs in integral relation with one of said plates arranged to be folded to embrace the other of said plates to secure them together.

My invention includes such a construction of the clasp member provided with said connecting lugs, as to insure that they shall be folded transversely to the grain of the sheet metal of which they are made.

My invention also comprehends the various novel features of construction and arrangement hereinafter more definitely specified and claimed.

In the accompanying drawings, Figure I, is an edge view of a clasp embodying my invention. Fig. II, is an inverted plan view of said clasp. Fig. III, is a plan view of a metal strip from which the clamp member provided with the integral connecting lugs is stamped. Fig. IV, is an edge view of the strip shown in Fig. III. Fig. V, is a plan view of an attaching plate showing a modified form of my invention.

Referring to Figs. I, and II, the attaching plate 1, comprises the loop 2, which may be sewed or otherwise attached to a flap of the shoe or other article to be provided with a clasp. Said plate 1, also comprises the arms 3, and 4, and the cross bar 5. Said arms 3, and 4, are provided with the hinge bearing flanges 7, and 8, at their inner edges to receive the trunnions 9, and 10, of the hook 11, which is adapted to engage an eye plate or bight on the other flap of said article.

The spring plate 12, comprises the cross bar 13, and the arms 14, and 15, provided with recesses 16; said arms being so related as to embrace the flanges 7, and 8, on the attaching plate 1, and receive the trunnions 9, and 10, of said hook 11, in said recesses 16. Said cross bar 13, of the spring plate 12, is provided with the integral lugs 17, and 18, arranged to embrace the cross bar 5, on said attaching plate 1, and thus retain said spring plate 12, so as to press its arms 14, and 15, against the flat trunnions 9, and 10, and restrain the movement of the hook 11, from its closed position shown in dotted lines in Fig. I, to its open position shown in full lines in said figure, and normally retain said tongue in closed position. Said lugs 17, and 18, are not only in integral relation with the plate 13, but it is significant that they extend in a particular direction with respect to the grain of the metal from which said plate is made, and, this may be conveniently effected as shown in Figs. III, and IV; wherein 19, is a strip of sheet steel whose grain extends in the direction of its length and which is conveniently progressed with respect to a stamping press in the direction of the arrow marked thereon, as indicated in dotted lines in said figure. Said plates 12, are stamped by a gang die comprising three groups, of which the first forms an H shaped opening 20, leaving the cross bars 13, provided with the integral lugs 17, and 18, projecting oppositely in the direction of the grain of the metal. The second group of dies registers with the opening 20; forms the hinge recesses 16, and, bends the lugs 17, and 18, downwardly as indicated in Fig. IV. The third group of dies punches the strip 19, with an opening 21, as shown in Fig. III, and thus detaches a spring plate 12 as included in dotted lines in said figure. The cross bar 5, of an attaching plate 1, is then placed between the parallel projecting lugs 17, and 18, of said spring plate, and, a hook 11, being seated in proper position between said attaching plate and spring plate; said lugs are oppositely folded upon the adjacent face of the attaching plate, as indicated in Figs. I and II. It is to be understood that if said lugs 17, and 18, did not project in the direction of the grain of the metal so as to be folded on lines transverse with respect thereto, it would be difficult if not impossible to manufacture a clasp of the integral construction above described, for the reason that said lugs would be broken from the spring plate by the folding operation. However, it is to be understood that it is not essential that said lugs shall be formed upon the spring plate. For instance, as shown in Fig. V, the plate 1, may have its cross bar 5, provided with integral lugs 25, and 26, to embrace the cross bar of a spring plate which is not provided with lugs, in the same manner that the lugs 17, and 18, of the spring plate 12, embrace the cross bar 5, in Figs. I and II.

I claim:—

In a spring clasp formed of stamped sheet metal, the combination with an attaching plate provided with an attaching loop and integral flanges forming hinge bearings and having a cross bar intermediate said loop and flanges; of a hook comprising trunnions fitted to said bearings; a separate spring plate having recesses registering with said trunnions having a cross bar corresponding to the cross bar in said attaching plate; and lugs integral with one of said plates folded about the cross bar of the other of said plates.

In testimony whereof, I have hereunto signed my name, at Philadelphia, Pennsylvania, this thirty-first day of August, 1905.

MARC STERNBERG.

Witnesses:
CLIFTON C. HALLOWELL,
E. L. FULLERTON.